(No Model.)
A. W. GRANT.
VEHICLE WHEEL.
No. 320,930. Patented June 30, 1885.
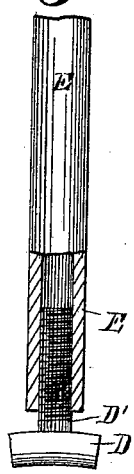
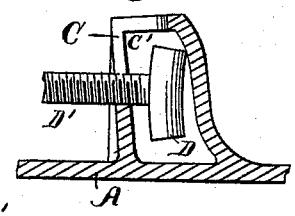
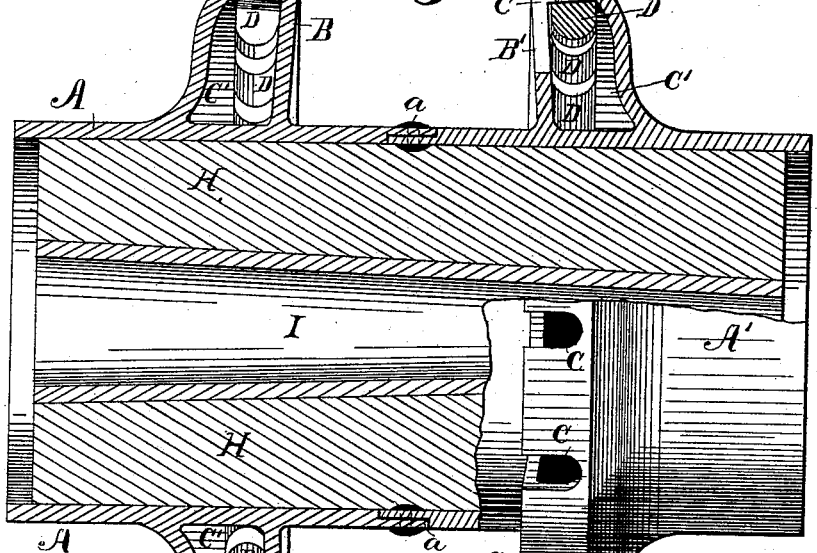
Witnesses
Collin Ford Jr.
G. C. Bowlus
Inventor
Arthur W. Grant
By N. E. O. Whitney
Atty
N. PETERS, Photo-Lithographer, Washington, D. C.

UNITED STATES PATENT OFFICE.

ARTHUR W. GRANT, OF SPRINGFIELD, OHIO.

VEHICLE-WHEEL.

SPECIFICATION forming part of Letters Patent No. 320,930, dated June 30, 1885.

Application filed February 24, 1885. (No model.)

*To all whom it may concern:*

Be it known that I, ARTHUR W. GRANT, of the city of Springfield, county of Clark and State of Ohio, have invented certain new and useful Improvements in Vehicle-Wheels, of which the following is a specification.

This invention relates to vehicle-wheels, and is especially intended as an improvement upon that class wherein the hub and spokes are constructed of metal.

The chief object of the invention is to provide a wheel which shall be light in construction and be particularly adapted to use with heavy vehicles.

Another object of the invention is to so construct the wheel that the strain upon or the load carried by the upper and lower spokes will be equal—that is to say, when the load upon the hub or axle of the vehicle is bearing down upon the lower spokes of the wheel, an equal pulling strain is exerted upon the upper spokes, thereby concentrating forces and equally distributing the work between the upper and lower portions of the wheel.

With these ends in view my invention consists in the combination, in a vehicle-wheel having a metallic hub and tire, of a series of hollow metallic spokes screw-threaded internally at their opposite ends and provided with screw-threaded bolts at their outer ends to extend through the tire, and with screw-threaded bolts or heads at their inner ends to engage the metallic hub, said bolts being screwed into the hollow-spokes and bearing upon the outside of the tire and inside of the flange of the hub, the hollow spokes when in place bearing upon the inner side of the tire or its felly and upon the outside of the hub or its flange, such construction and arrangement preventing longitudinal movement of the spokes when strain is exerted upon them, substantially as hereinafter described.

It also consists in certain features of construction and arrangement of parts in the wheel, as will be hereinafter described, and pointed out in the claims.

Figure 1 represents in front elevation, partially in vertical cross-section, a portion of a vehicle-wheel embodying my improvements. Fig. 2 is a side view of a portion of a hollow spoke as provided with an elongated-headed bolt screwed therein. Fig. 3 represents in section a portion of the annular spoke-receiving flange of the hub, showing one position of the bolt-head entering the opening in the flange to illustrate the method of positioning and connecting the spoke with the hub, and Fig. 4 is a perspective view of the concaved metallic-washer which is interposed between the spoke and felly.

The hub of the wheel, which is constructed of metal, is preferably cast in two sections, A A', each section forming half of the hub, they being connected together, as shown at *a*.

The hub sections A A' are each provided with a hollow annular flange, B B', respectively, the said flanges being cast as a part with the hub-sections, and being provided with spoke-receiving openings C, the said openings being Γ-shaped when viewed in cross-section, (see Fig. 3,) they extending through a portion of the entire length of the upper and inner sides of the flanges B B', and being of a width sufficient to allow the entrance of the head D of a screw-threaded bolt, D', which bolt is screwed into the inner end of the hollow metallic spoke E.

The spoke E will preferably be tapered slightly from its inner to its outer end, and is provided with a bolt, F, at its outer end which is screwed into the same, the said bolt F extending through the felly F' and tire F², and being provided with a head, *f*, which head will in practice be square and be countersunk in the metallic tire to prevent the bolt being accidentally turned.

A concaved metallic washer is provided between the felly and spoke to form a substantial bearing for the said spoke.

As will be noticed, the wheel is provided with two sets of spokes arranged at different angles, as in bicycle and other similar wheels, they bearing upon the hub at considerable distance from each other. To give the spokes a firm bearing in a straight line upon the flanges, the said flanges are set at an angle substantially equal to the angle of the spokes, the bearing-face of the flanges being at right angles thereto.

The heads D of the inner bolts D' are elongated, the openings C being equal to their width and of sufficient length to permit their entrance into the space C' lengthwise.

The wheel is set up as follows, the two sections A A' of the hub being connected together by riveting or otherwise. The bolt-head D is first inserted into the flange through the opening C at the inner side of the flange, the bolt-shank D' being nearly horizontal and its head D vertical thereto, after which the bolt is turned until the head is horizontal in the flange, when the bolt-shank is raised to a vertical position, or nearly so, this bringing the shank through the horizontal opening in the flange and in a position to be connected with the hollow spoke. The spoke E is then screwed over the shank of the bolt until its lower edge bears upon the face of the flange, this bringing the bolt-head D tightly against the under side of the face of the flange and securing the spoke, flange, and bolt rigidly together. The spoke is then secured to the felly and its tire by means of the bolt F being inserted through the felly and tire and screwed into the spoke, as shown in Fig. 1, the washer $g$ being inserted between the felly and spoke to form a substantial bearing.

By this arrangement and construction it will be noticed that the spokes have bearings upon the inner side of the felly and upon the outer side of the hub-flanges, and that the bolts which connect them to the hub and tire have bearings upon the outside of the tire and upon the inner side of the hub-flanges. Therefore it will be noticed that when a load is carried the strain is borne equally by the upper and lower spokes—that is, when the weight is bearing down upon the lower spokes it is exerting the same amount of pulling-strain upon the bolts of the upper spokes, thereby distributing the work, as hereinbefore described.

The hub will preferably be provided with a wooden filling, H, which is bored out to receive the axle-box I.

If desired, the hub may be constructed or cast in one piece. It is, however, desirable to cast it in sections, as shown in the drawings.

By providing the wheel with hollow metallic spokes, and especially in the shape illustrated in the drawings, I am enabled to secure the maximum amount of strength and rigidity with the minimum amount of material and weight, and by having the bolts to engage the spokes upon their inner sides, as herein shown, I do not weaken the spokes at their ends, it being a well-known fact that internal screw-threading does not materially weaken tubing. The spokes will preferably be of drawn steel.

I am aware that wheels have been provided with solid spokes and have been connected to the hub by means of headed bolts having hollow shanks, such shanks being screwed upon the solid spokes, and such construction I do not broadly claim.

The heads D of the bolts D' are elongated and curved to correspond to the curve of the flange of the hub, the width of the bolt-head being nearly equal to the diameter of its shank.

I claim—

1. In a vehicle-wheel, the combination, with the hub and rim or tire, of a series of hollow metallic spokes internally screw-threaded at their ends and having headed bolts screwed therein, said bolts being adapted to engage the hub and rim of the wheel, substantially as shown and described.

2. In a vehicle-wheel, the metallic hub provided with two hollow annular flanges, said flanges being provided with spoke or bolt receiving openings formed through a portion of two faces of the flanges, in combination with the hollow spokes E, their headed bolts D', engaging the flanges as shown, and the headed bolts F, engaging the spokes and tire, substantially as described.

3. The combination, in a vehicle-wheel having two sets of hollow spokes, E, set at an angle to each other and at an angle to the line of circumference of the wheel, of the hub A A', provided with the hollow flanges B B', set at an angle to the hub, said angle corresponding, substantially, to inclination of the spokes connected therewith, said flanges having the openings C formed therein, and being adapted to receive the headed bolts D', substantially as shown and described.

4. In a wheel having a metallic hub provided with hollow annular flanges having the openings C formed therein, as shown, and hollow metallic spokes internally screw-threaded at their ends, as described, the combination, with said spokes and hub, of the bolts D', screw-threaded at their shank and provided with elongated curved heads D, the width of said heads being nearly equal to the diameter of their shanks, their curve being equal to the curve or radius of the flange, substantially as described.

In witness whereof I have hereunto set my hand and seal, at Springfield, Ohio, this 16th day of February, A. D. 1885.

ARTHUR W. GRANT. [L. S.]

In presence of—
  N. E. C. WHITNEY,
  P. J. CLEVENGER.